United States Patent
Kikkawa

(10) Patent No.: US 7,972,096 B2
(45) Date of Patent: Jul. 5, 2011

(54) SPINDLE DEVICE OF MACHINE TOOL

(75) Inventor: Yasuhiko Kikkawa, Yamanashi (JP)

(73) Assignee: Makino Milling Machine Co., Ltd., Tokyo (JP)

( * ) Notice: Subject to any disclaimer, the term of this patent is extended or adjusted under 35 U.S.C. 154(b) by 874 days.

(21) Appl. No.: 11/914,832

(22) PCT Filed: May 26, 2005

(86) PCT No.: PCT/JP2005/010093
§ 371 (c)(1),
(2), (4) Date: Nov. 19, 2007

(87) PCT Pub. No.: WO2006/126284
PCT Pub. Date: Nov. 30, 2006

(65) Prior Publication Data
US 2009/0053005 A1 Feb. 26, 2009

(51) Int. Cl.
*B23Q 11/10* (2006.01)
(52) U.S. Cl. .................. 409/136; 409/233; 408/56
(58) Field of Classification Search .......... 409/135–136, 409/231, 233; 408/56, 57, 59
See application file for complete search history.

(56) References Cited

U.S. PATENT DOCUMENTS

| | | | |
|---|---|---|---|
| 4,957,398 A * | 9/1990 | Schneider et al. | 409/136 |
| 5,707,186 A * | 1/1998 | Gobell et al. | 409/136 |
| 5,782,586 A | 7/1998 | Geissler | |
| 7,165,302 B2 * | 1/2007 | Kikkawa et al. | 29/426.1 |
| 7,704,022 B2 * | 4/2010 | Petrescu | 409/231 |
| 2003/0223834 A1 | 12/2003 | Choi | |
| 2004/0074074 A1 | 4/2004 | Mochizuki et al. | |

FOREIGN PATENT DOCUMENTS

| | | |
|---|---|---|
| DE | 10027750 A1 * | 12/2001 |
| JP | 03213243 | 9/1991 |
| JP | 04002438 A * | 1/1992 |
| JP | 04191587 A * | 7/1992 |
| JP | 04193450 | 7/1992 |
| JP | 06047648 A * | 2/1994 |
| JP | 6-241364 | 8/1994 |
| JP | 7-40055 | 7/1995 |
| JP | 08267339 A * | 10/1996 |
| JP | 11033876 | 2/1999 |
| WO | WO 03045622 A1 * | 6/2003 |

* cited by examiner

*Primary Examiner* — Daniel W Howell
(74) *Attorney, Agent, or Firm* — Paul & Paul

(57) ABSTRACT

The present invention provides a cartridge-type spindle device having an easily separable structure despite the fact that it comprises a rotary joint for a through spindle coolant device. In the cartridge replacement type spindle device (11), front bearings of the spindle are built in a front housing (23) and rear bearings of the spindle (15) are supported on a rear housing (25) so that, when the front housing (23) is separated from the rear housing (25), the front bearings (17a, 17b), the spindle (15), and the rear bearings (19a, 19b) can be separated from the rear housing (25) integrally with the front housing (23). The rotary joint is disposed in a piston (63) of an unclamp means for unclamping a tool (21, T) mounted to the forward end of the spindle (15), so that a draw bar (51) accompanied by a seal ring can be separated from the rear housing (25) and the rotary joint together with the spindle (15) and the front housing (23).

1 Claim, 2 Drawing Sheets

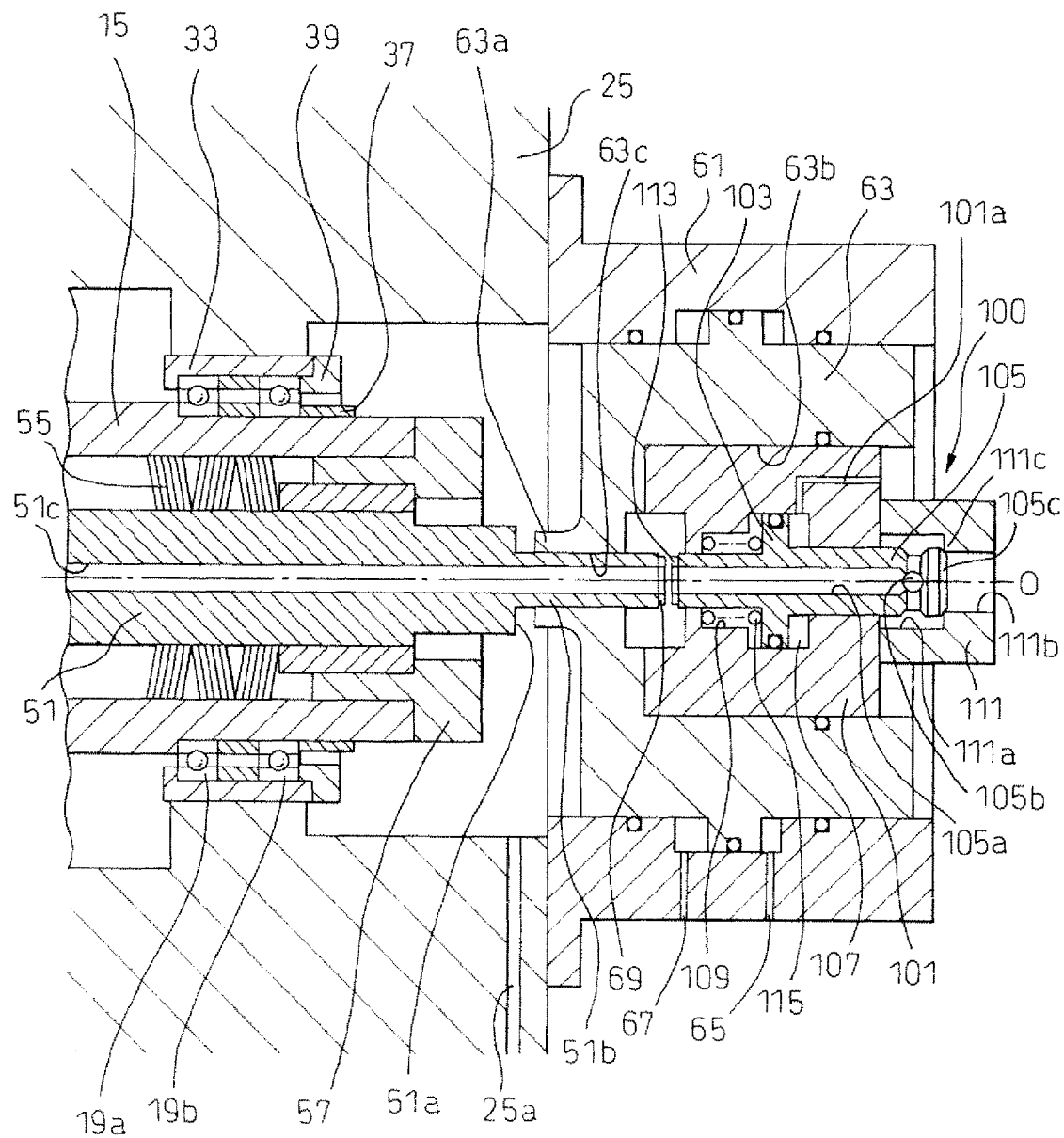

SPINDLE DEVICE OF MACHINE TOOL

TECHNICAL FIELD

The present invention relates to a spindle device of a machine tool for facilitating a change of a spindle of a vertical or horizontal milling machine or a machining center, etc., and in particular to a spindle device of a machine cool having a through spindle coolant unit for applying a working, fluid through the spindle.

BACKGROUND ART

A spindle device of a machine tool which is rotated at high speed and receives high cutting resistance during a cutting operation, may result in a bearing or a collet being damaged or worn, or a disk spring for a tool clamp arranged in a spindle being broken. Such problems in the spindle device may occur not only in the spindle itself but also in the internal structure of the spindle and the bearing. In the case where the spindle device is repaired on the site of operation of the machine tool, it is common practice to remove hydraulic and pneumatic pipes for lubrication, cooling or cleaning, and electrical wiring to the motor and the limit switch, disassemble the whole spindle device, change the spindle, the parts in the spindle or the bearing and then reassemble them. This results in large-scale repair work that requires sophisticated expertise and skill along with considerable time. For this reason, a spindle device generally referred to as a cartridge-type spindle in which the spindle and the bearing can be removed integrally has been developed and disclosed in, for example, U.S. Patent Publication No. 2004/0074074A1.

In recent years, on the other hand, heavy cutting has been required in machine tools in order to reduce machining time. This greatly increases the temperature of the machining area between the cutting edge, of the tool and the workpiece. Therefore, in order to efficiently cool the machining area, a through spindle coolant device has been used in which a coolant or pressured air flows through the spindle of the machine tool and is supplied to the machining area from the tool mounted at the forward end of the spindle. Japanese Unexamined Patent Publication No. 6-241364 discloses such a through spindle coolant device and a rotary joint for transferring a fluid from a fixed pipe to a rotating pipe of the through spindle coolant device.

However, the rotary joint disclosed in Japanese Unexamined Patent Publication No. 6-241364 does not have an assumption that it would be applied to the cartridge-type spindle device. Therefore, an attempt to use the rotary joint for the cartridge-type spindle has a problem in that the spindle cannot be smoothly pulled off. Specifically, when the rotary joint described in Japanese Unexamined Patent Publication No. 6-241364 is just applied to the cartridge-type spindle device, the rotary joint will be arranged behind the unclamp device of the draw bar. This requires the draw bar to be long or requires support for the bearing in the process, thereby posing a problem that a structure is required in which the draw bar can be separated while being pulled off the spindle.

DISCLOSURE OF THE INVENTION

The technical object of the present invention is to solve these problems of the prior art and an object of the present invention is to provide a cartridge-type spindle device having an easily separable structure despite the fact that it comprises a rotary joint for a through spindle coolant device.

In order to achieve the above object, according to the present invention, there is provided a spindle device of a machine tool having a spindle rotatably supported in a housing by a front bearing and a rear bearing, the housing including a front housing and a rear housing which are separably fastened, the front bearing of the spindle built in the front housing, the rear bearing of the spindle supported by the rear housing, the front bearing, the spindle and the rear bearing adapted to be able to be separated from the rear housing integrally with the front housing when the front housing is separated from the rear housing, which includes:

a draw bar extending in the spindle along a central axis of the spindle for clamping a tool mounted to the forward end of the spindle;

a coolant passage formed to extend through the draw bar along the central axis;

an unclamp unit having a draw bar driving piston for pushing, the draw bar toward the forward end of the spindle along the central axis for unclamping the tool mounted to the forward end of the spindle; and a rotary joint located in a recess formed in the piston of the unclamp unit, and including a coolant supply pipe having a second seal ring attached to the forward end thereof and provided so as to be movable along the central axis of the spindle in such a manner as to come into contact with or be separated from a first seal ring attached to the rear end of the draw bar, wherein the draw bar accompanied by the first seal ring can be separated from the rear housing and the rotary joint together with the spindle and the front housing.

According to the present invention, the unclamp means is provided close behind the rear end of the spindle, and the rotary joint is located in the draw bar driving piston of the unclamp means. Therefore, the rearward projection amount or rearward extension amount (overhang) of the draw bar can be shortened, and the seal ring on the rotation side of the rotary joint can be configured without a bearing. Also, since the rearward projection of the draw bar can be shortened, the spindle including the draw bar can be shortened, so that the spindle can be easily separated from the rear housing, thereby making it possible to change the spindle easily and quickly.

BRIEF DESCRIPTION OF THE DRAWINGS

FIG. 2 is an enlarged sectional view of the rear end portion of the spindle, showing a rotary joint according to a preferred embodiment of the present invention.

BEST MODE FOR CARRYING OUT THE INVENTION

Figure 1:
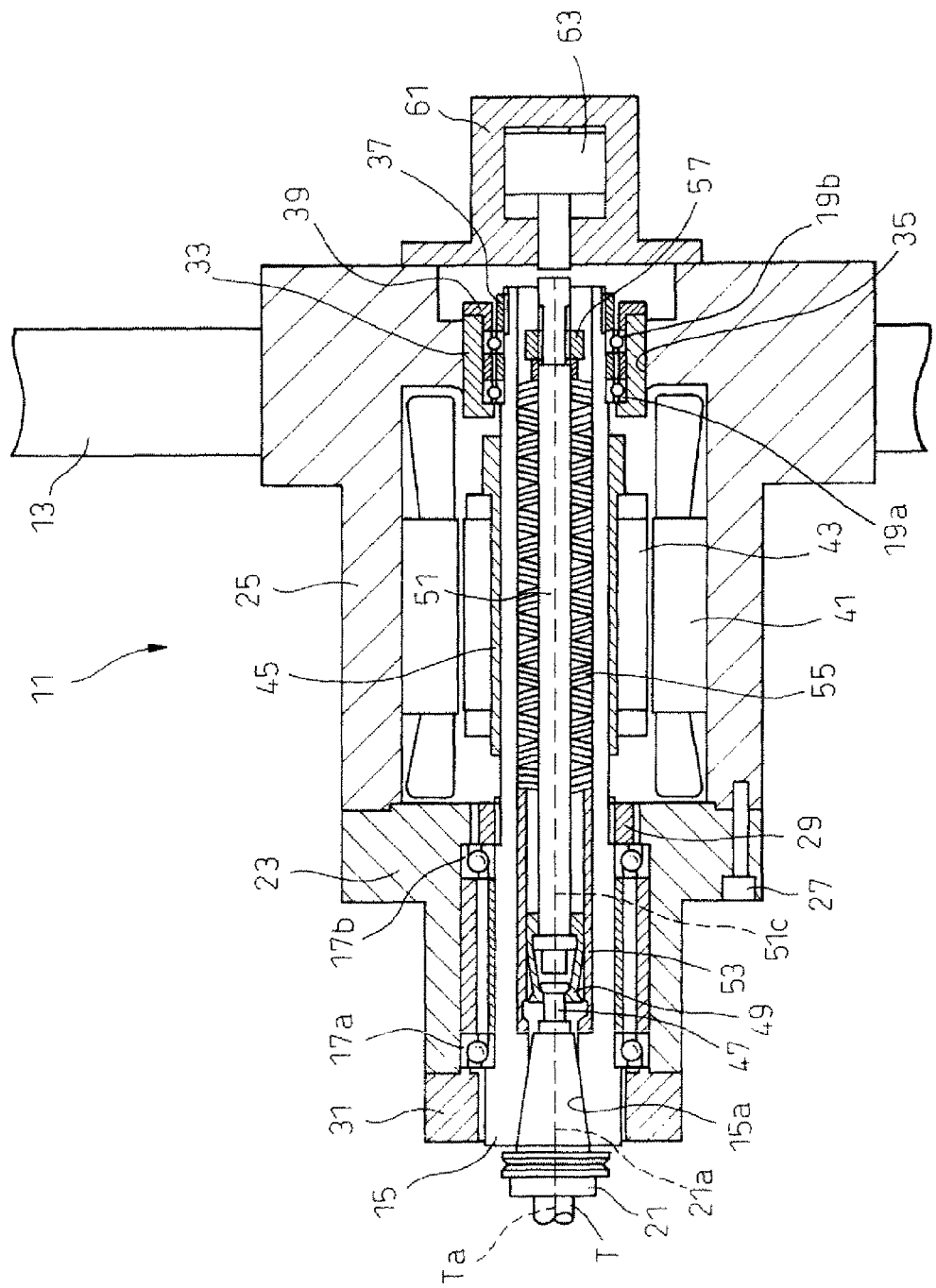
FIG. 1 is a sectional view of a spindle device of a machine tool according to the present invention.

The preferred embodiments of the present invention will be described below with reference to the accompanying drawings. Although the present invention is described below with reference to the embodiments, taking a horizontal machining center as an example, it is not limited to a horizontal machining center, but may also be applied to a vertical machining center.

In FIG. 1, a spindle head 11 of a horizontal machining center is adapted to move up and down along a Y-axis guide rail 13 of a column (not shown) erected and fixed on a bed (not shown) making up a base. A spindle 15, rotationally driven by a built-in motor, is rotatably supported in the spindle head 11 through front bearings 17a, 17b and rear bearings 19a, 19b. A tool holder 21 having various tools (not shown) mounted therein can be changeably mounted in a tapered hole 15 at the forward end of the spindle 15.

A housing of the spindle head 11 is configured of a front housing 23 and a rear housing 25, both of which are integrally fastened to each other with a plurality of bolts 27. The two front bearings 17a, 17b for rotatably supporting the front portion of the spindle 15 are provided in the front housing 23. The inner race of the left front bearing 17a is in contact with the shoulder of the spindle 15, and the inner race of the right front bearing 17b is fixed to the spindle 15 by a nut 29 through an inner race collar. The outer race of the right front bearing 17b is in contact with the shoulder of the front housing 23, and the outer race of the left front bearing 17a is fixed by a bearing holder 31 through an outer race collar.

A bearing case 33 is fitted into a hole 35 formed in the rear; housing 25, and the two rear bearings 19a, 19b for rotatably supporting the rear portion of the spindle 15 are provided in the bearing case 33. The inner race of the left rear bearing 19a is in contact with the shoulder of the spindle 15, and the inner race of the right rear bearing 19b is fixed to the spindle 15 by a nut 37 through an inner race collar. The outer race of the left rear bearing 19a is in contact with the shoulder of the bearing case 33, and the outer race of the right rear bearing 19b is fixed by a bearing holder 39 through an outer race collar.

A stator 41 of the built-in motor is provided in the rear housing 25, while a rotor 43 thereof is provided on the side of the spindle 15 with a minuscule radial gap between the stator 41 and the rotor 43. The rotor 43 is shrinkage fitted on a shrinkage fitting sleeve 45, which in turn is shrinkage fitted on the spindle 15.

The tool holder 21 is inserted into the tapered hole 15a at the forward end of the spindle 15, and a pull stud 47 provided at the rear portion of the tool holder 21 is held by a collet 49. The collet 49 is retractable in the axial direction by a draw bar 51. A multiplicity of disk springs 55 are provided on the inner peripheral surface of the spindle 15 through a sleeve 53, and the right side of the disk springs 55 is restricted by a nut 57 screwed into the rear end of the draw bar 51 through a collar. The disk springs 55 apply a rearward elastic urging force to the draw bar 51, so that the collet 49 clamps the taper shank of the tool holder 21 in close contact with the tapered hole 15a of the spindle 15.

A draw bar driving means for pushing and driving the draw bar 51 toward the forward end of the spindle 15 is provided in the rear of the rear housing 25. The draw bar driving means includes a draw bar driving cylinder 61 mounted to the rear end of the rear housing 25, and a draw bar driving piston 63 reciprocating along the central axis O hydraulically in the draw bar driving cylinder 61. Referring to FIG. 2 which is an enlarged sectional view of the rear end portion of the spindle 15, the draw bar driving piston 63 is formed with a contact portion 63a projected in the form of a boss from the forward end surface (right end surface in FIG. 2) opposed to the rear end of the spindle 15, a recess 63b formed to open rearward in the draw bar driving piston 63, and a through hole 63c extended from the contact portion 63a to the recess 63b. The draw bar driving cylinder 61 is formed with first and second hydraulic ports 65 and 67.

On the other hand, the draw bar 51 includes an extension 51b extending rearward from the rear end portion of the draw bar 51 along the central axis O so as to be fitted slidably into the through hole 63c of the draw bar driving piston 63, and a contact shoulder 51a formed at the root of the extension 51b so as to be able to come into contact with and come away from the contact portion 63a. The draw bar 51, as described above, is urged rearward by force of the disk spring 55 in order to clamp the tool holder 21 mounted in the tapered hole 15a of the spindle 15. Once the pressured oil is supplied to the first hydraulic port 65 of the draw bar driving cylinder 61, the draw bar driving piston 63 moves forward and the contact portion 63a thereof comes into contact with the contact shoulder 51a of the draw bar 51 thereby to press the draw bar 51 forward. As a result, the collet 49 is moved forward through the draw bar 51. Then, the forward end of the collet 49 is positioned in the portion of the sleeve 53 having a large inner diameter, so that the collet 49 is disengaged from the pull stud 47 thereby to unclamp the tool holder 21.

Further, referring to FIG. 2, a seal ring 69 is attached to the rear end of the draw bar 51 and a coolant passage 51c is formed along the central axis O of the draw bar 51. The coolant passage 51c is supplied with the coolant from the rotary joint 100 built in the draw bar driving piston 63 as described later. This coolant is ejected from the coolant passage 51c into the machining area between a cutting edge (not shown) of the tool T and a workpiece (not shown) through the passages 21a and Ta formed in the tool holder 21 and the tool T, respectively.

The rotary joint 100 includes a cylinder 101 disposed in a recess 63b of the draw bar driving piston 63, and a piston 103 provided in the cylinder 101 so as to be reciprocate along the central axis O. A piston 103 is formed in a flange shape so as to be integrated with a coolant supply pipe 105, and the inner space of the cylinder 101 is divided into a pneumatic chamber 107 and a spring chamber 109 by the piston 103. A coil spring 115 for urging the piston 103 and the coolant supply pipe 105 rearward is provided in the spring chamber 109.

Also, a pneumatic port 101a for supplying compressed air to the pneumatic chamber 107 is formed in the cylinder 101, and is connected to an external air pressure source (not shown) so that the compressed air can be supplied from the air pressure source into or discharged from the pneumatic chamber 107.

The coolant supply pipe 105 includes a seal ring 113 attached to the forward end of the coolant supply pipe 105 so as to face the seal ring 69 of the draw bar 51, a coolant passage 105a formed along the central axis O, a plurality of (four in the embodiment of FIG. 2) radial paths 105b formed so as to extend radially and open to the coolant passage 105a at the portion adjacent to the rear end of the coolant supply pipe 105, and a cutoff valve 105c formed at the rear end of the coolant supply pipe 105. Also, a joint member 111 for connecting a hose (not shown) for connecting the coolant supply pipe 105 to an external coolant supply unit (not shown) is coupled to the rear end surface of the cylinder 101. The joint member 111 is formed in a substantially cylindrical shape and includes an inner space 111a for accommodating the rear end portion of the coolant supply pipe 105 including the radial passage 105b, and an inlet port 111b extending from the rear end of the joint member 111 to the inner space 111a and coupled with an end of the hose. The inner diameter of the inlet port 111b is smaller than that of the inner space 111a, and a valve seat 111c for the cutoff valve 105c of the coolant supply pipe 105 to sit thereon is formed between the inlet port 111b and the inner space 111a.

An operation of this embodiment will be described below.

By supplying a working oil from an external oil pressure source (not shown) to the first hydraulic port 65 and at the same time recovering the working oil from the second hydraulic port 67 to the oil pressure source, the draw bar driving piston 63 advances leftward in FIGS. 1 and 2. As a result, the contact portion 63a of the draw bar driving piston 63 comes into contact with the contact shoulder 51a of the draw bar 51. The draw bar 51 advances leftward in FIGS. 1 and 2 against the urging force of the disk spring 55, so that the tool T is unclamped together with the tool holder 21 mounted in the tapered hole 15a at the forward end of the spindle 15. On the contrary, by supplying the working oil to the second hydraulic port 67 and the same time recovering the working oil from the first hydraulic port 65, the draw bar driving piston 63 is retreated and the draw bar 51 is moved rearward (rightward in FIGS. 1 and 2) by the urging force of the disk spring 55. As a result, the collet 49 at the forward end of the draw bar 51 pulls the tool holder 21 into the tapered hole 15a while holding the pull stud 47 of the tool holder 21, so that the tool holder 21 and the tool T are clamped at the forward end of the spindle 15.

Next, before starting the machining operation with the tool T, compressed air is supplied to the pneumatic port 101a of the cylinder 101 of the rotary joint 100, and the piston 103 and the coolant supply pipe 105 are urged leftward in FIG. 2 against the urging force of the coil spring 115. The seal ring 113 attached to the forward end of the coolant supply pipe 105 comes into contact with the seal ring 69 attached to the rear end of the draw bar 51, so that the coolant passage 105a of the coolant supply pipe 105 of the rotary joint 100 communicates with the coolant passage 51c of the draw bar 51. At the same time, the cutoff valve 105c at the rear end of the coolant supply pipe 105 moves away from the valve seat 111c, and the coolant passage 105a of the coolant supply pipe 105 communicates with the external coolant source through the radial passage 105b and a hose (not shown) connected to the inlet port 111b of the joint member 111. Thus, the coolant supplied from the coolant source is ejected into the machining area between the cutting edge of the tool T and the workpiece through the hose, the inlet port 111b, the radial passage 105b, the coolant passage 105a, the coolant passage 51c and the passages 21a, Ta formed in the tool holder 21 and the tool T, respectively. The coolant leaking from between the two seal rings 113, 69 flows partly into the rear housing 25 through the gap between the extension 51b of the draw bar 51 and the through hole 63c of the draw bar driving piston 63. However, the leaking coolant can be recovered by appropriately forming a drain 25a in the rear housing 25.

On the other hand, the front housing 23 is separated from the rear housing 25 together with the spindle 15 through the front bearings 17a, 17b by loosening the bolts 27 and pulling the front housing 23 forward. In the process, the spindle 15 has attached thereto the component parts built in the spindle 15 including the rotor 43, the bearing case 33 having the rear bearing 19 built therein, the tool holder 21, the collet 49, the draw bar 51 and the disk spring 55. These parts that can be removed together with the front housing 23 are called the front housing unit. Further, the draw bar 51 is pulled out with the spindle 15 and the seal ring 69, while at the same time separating the draw bar 51 from the coolant supply pipe 105. Specifically, the coolant supply passage extending from the coolant source to the machining area constituted by the hose, the inlet port 111b, the radial passage 105b, the coolant passage 105a, the coolant passage 51c, the passage 21a of the tool holder 21 and the passage Ta of the tool T etc. is separated between the seal ring 69 of the draw bar 51 and the seal ring 113 of the coolant supply pipe 105.

Although this embodiment represents a case in which the rotary joint 100 is fixed in the recess 63b of the piston 63, the rotary joint 100 may be supported by a bracket from the cylinder 61 and located in the recess 63b of the piston 63 independently of the piston 63.

Further, although this embodiment has been described taking a structure as an example in which the front housing unit of the horizontal machining center is manually pulled off from the rear housing 25, the present invention is not limited to this structure and can be applied to a spindle device of a vertical machining center. Specifically, a flange-equivalent member of the front housing of the vertical spindle device is fixed on a table through a jig and, using the Z-axis vertical feed motion, the front housing unit can be pulled out of the rear housing in the same manner as in the horizontal machining center. The present invention can be also applied to a multipurpose machine tool for manually performing the feed operation as well as to the machining center and the NC machine tool.

The invention claimed is:

1. A spindle device of a machine tool having a spindle rotatably supported in a housing by a front bearing and a rear bearing, said housing including a front housing and a rear housing which are separably fastened, said front bearing of said spindle built in said front housing, said rear bearing of said spindle supported by said rear housing, said front bearing, said spindle and said rear bearing adapted to be able to be separated from said rear housing integrally with said front housing when said front housing is separated from said rear housing, said spindle device comprising:

a draw bar extending in said spindle along a central axis of said spindle for clamping a tool mounted to a forward end of said spindle;

a coolant passage formed to extend through said draw bar along the central axis;

an unclamp unit having a draw bar driving piston for pushing said draw bar toward the forward end of said spindle along the central axis for unclamping said tool mounted to the forward end of said spindle; and a rotary joint including a cylinder located in a recess formed in said draw bar driving piston of the unclamp unit and a coolant supply pipe having a second seal ring attached to the forward end thereof and provided so as to be movable as a piston in the cylinder along the central axis of said spindle in such a manner as to come into contact with and be separated from a first seal ring attached to the rear end of said draw bar, wherein the coolant supply pipe is moved by supplying a fluid into one chamber of the cylinder, which is separated by the coolant supply pipe, and a cutoff valve is mounted at a rear end of the coolant supply pipe; and wherein said draw bar accompanied by said first seal ring can be separated from said rear housing and said rotary joint together with said spindle and said front housing.

* * * * *